US011897630B2

(12) United States Patent
Rezvani et al.

(10) Patent No.: US 11,897,630 B2
(45) Date of Patent: Feb. 13, 2024

(54) DRONE LANDING GROUND STATION WITH MAGNETIC FIELDS

(71) Applicant: Alarm.com Incorporated, Tysons, VA (US)

(72) Inventors: Babak Rezvani, Tysons, VA (US); Donald Gerard Madden, Columbia, MD (US); Glenn Tournier, Tysons, VA (US); Ahmad Seyfi, Tysons, VA (US)

(73) Assignee: Alarm.com Incorporated, Tysons, VA (US)

( * ) Notice: Subject to any disclaimer, the term of this patent is extended or adjusted under 35 U.S.C. 154(b) by 386 days.

(21) Appl. No.: 17/079,085

(22) Filed: Oct. 23, 2020

(65) Prior Publication Data

US 2021/0122495 A1    Apr. 29, 2021

Related U.S. Application Data

(60) Provisional application No. 62/925,399, filed on Oct. 24, 2019.

(51) Int. Cl.
| | | |
|---|---|---|
| *B64U 70/97* | (2023.01) | |
| *B64F 1/12* | (2006.01) | |
| *B64C 39/02* | (2023.01) | |
| *B64F 1/00* | (2006.01) | |
| *B64U 10/13* | (2023.01) | |
| *B64U 50/34* | (2023.01) | |
| *B64U 70/00* | (2023.01) | |

(52) U.S. Cl.
CPC .............. *B64F 1/12* (2013.01); *B64C 39/024* (2013.01); *B64F 1/007* (2013.01); *B64U 70/97* (2023.01); *B64U 10/13* (2023.01); *B64U 50/34* (2023.01); *B64U 70/00* (2023.01); *B64U 2201/10* (2023.01)

(58) Field of Classification Search
CPC .......... B64F 1/12; B64F 1/18; B64C 2201/18; B64C 2201/127; G05D 1/0676; B64U 70/90; B64U 70/92; B64U 70/95; B64U 70/97; B64U 70/99
See application file for complete search history.

(56) References Cited

U.S. PATENT DOCUMENTS 9,290,277 B2 * 3/2016 You ........................... B64F 1/18
9,975,634 B2 * 5/2018 Von Novak, III ... G08G 5/0069
(Continued)

FOREIGN PATENT DOCUMENTS

| EP | 4230524 A1 * | 8/2023 | ............. B64C 39/02 |
| KR | 20170039356 A * | 4/2017 | ........... B64C 39/024 |
(Continued)

*Primary Examiner* — Christopher D Hutchens
*Assistant Examiner* — Michael A. Fabula
(74) *Attorney, Agent, or Firm* — Fish & Richardson P.C.

(57) ABSTRACT

Methods, systems, and apparatus for drone landing ground station. A method includes determining that a drone is landing on a ground station, based on determining that the drone is landing on the ground station, determining a magnetic field to generate at a first magnetic component at a first position in the ground station and an opposing magnetic polar at a second magnetic component at a second position in the ground station, and generating the magnetic field at the first magnetic component and the opposing magnetic field at the second magnetic component.

20 Claims, 6 Drawing Sheets

(56) References Cited

U.S. PATENT DOCUMENTS

| | | |
|---|---|---|
| 10,152,059 B2 | 12/2018 | Banerjee et al. |
| 10,462,366 B1 | 10/2019 | Bart et al. |
| 10,870,498 B2 | 12/2020 | Zambelli |
| 10,913,546 B2* | 2/2021 | Krauss ................ B64F 1/18 |
| 10,958,835 B1 | 3/2021 | Bart et al. |
| 11,378,982 B2* | 7/2022 | Wang .............. B64C 39/024 |
| 11,572,197 B1* | 2/2023 | Nevdahs ............. B64F 1/362 |
| 2011/0049290 A1 | 3/2011 | Seydoux et al. |
| 2014/0236390 A1* | 8/2014 | Mohamadi ........... B64D 47/08 |
| | | 701/16 |
| 2015/0069968 A1* | 3/2015 | Pounds .............. H02J 7/0044 |
| | | 320/109 |
| 2015/0225081 A1 | 8/2015 | Stabler et al. |
| 2015/0266575 A1* | 9/2015 | Borko ................ B64F 1/222 |
| | | 244/17.23 |
| 2015/0316927 A1 | 11/2015 | Kim et al. |
| 2016/0144982 A1 | 5/2016 | Sugumaran |
| 2016/0244187 A1* | 8/2016 | Byers ................. B64D 1/00 |
| 2018/0009527 A1* | 1/2018 | Von Novak, III ... G08G 5/0013 |
| 2018/0039286 A1* | 2/2018 | Tirpak ............... G05D 1/0094 |
| 2018/0105287 A1* | 4/2018 | Carreker ............. B64G 1/40 |
| 2018/0137767 A1* | 5/2018 | Hou ................. G08G 5/0026 |
| 2018/0141657 A1 | 5/2018 | Han et al. |
| 2018/0233007 A1 | 8/2018 | Williams |
| 2020/0117218 A1* | 4/2020 | Wang ................ B64C 25/001 |
| 2021/0163135 A1* | 6/2021 | Shin .................. H05K 9/00 |

FOREIGN PATENT DOCUMENTS

| | | | |
|---|---|---|---|
| WO | WO-2018140050 A1 * | 8/2018 | ............ B60L 53/12 |
| WO | WO-2019180695 A1 * | 9/2019 | ............ B64C 25/58 |

* cited by examiner

DRONE LANDING GROUND STATION WITH MAGNETIC FIELDS

CROSS-REFERENCE TO RELATED APPLICATION

This application claims the benefit of U.S. Application Ser. No. 62/925,399 filed on Oct. 24, 2019, which is incorporated herein by reference in its entirety.

TECHNICAL FIELD

This disclosure application relates generally to monitoring systems.

BACKGROUND

Many properties are equipped with property monitoring systems that include sensors and connected system components. Property monitoring systems can receive and analyze data from sensors that are internal and external to the property. Sensors can be fixed or can be mobile. Mobile sensors can be mounted on robotic devices such as drones.

SUMMARY

A drone ground station may include a conical landing station with self-centering restoring forces that nudge the drone back to the middle of the ground station. The ground station may include landing markers to aid the drone in navigating to the ground station and magnets are used to hold drone in place for better localization. The drone may land at an angle and orient in the best direction to enable sensing while docked and being ready for launch. The ground station can be mobile, which can facilitate the drone's ability to land and reach the ground station when battery is low. In some instances the ground station may not be on the ground. Instead the ground station may be located on wall, ceiling, or other elevated location.

The details of one or more implementations of the subject matter described in this specification are set forth in the accompanying drawings and the description below. Other features, aspects, and advantages of the subject matter will become apparent from the description and the drawings.

BRIEF DESCRIPTION OF THE DRAWINGS

Like reference numbers and designations in the various drawings indicate like elements.

DETAILED DESCRIPTION

Autonomous landing of drone or other type of aircraft is a challenging problem requiring sensor accuracy and maneuverability. Key to enabling autonomous landing is a ground station that provides sufficient features and/or landmarks to allow for vision processing techniques to guide the drone through vision processing techniques, a physical form factor that provides restoring forces to place the drone in the correct position, and mechanical characteristics to allow for precise landing of the drone in a repeatable manner both automated and manually.

The ground station contains unique, discernable features that can be detected by a visual camera at a distance and at altitude. This visual pattern allows for camera extrinsic parameter calculations to occur to allow for successful navigation of the drone to the ground station. This relative information is critical to correct for any offset or errors due to flight operations prior to landing, e.g., sensor drift and therefore, inaccuracies between the drone's estimated position and actual position in the mapped space. These ground station features may be in the visible spectrum as detected by an electro-optical camera passively or by infrared (IR) photoreflectors that reflect IR wavelengths and are detected by a time of flight or similar sensor using a transmitter/receiver pair. With the drone storing or able to access data related to the ground station features, the drone is able to detect the ground station when the background of a room, such as a corner of a room. The drone and ground station may use visual and/or IR features to enable operation under all lighting conditions including visible darkness.

The drone and/or the ground station can have a particular physical form factor. A conical form factor for the drone provides a restoring forcing due to lift reflections back to drone when offset. When slightly offset from the ground station, the air pushed down by the drone to provide lift pushes back against the ground station at the draft angle generating a lateral force, which pushes the drone back into the center. When implemented in a circular or semi-circular fashion, it allows for self-centering of the drone.

In some implementations, the ground station may include a conical form. In this case, the drone pushes air down to provide lift. When the drone is off the center of the ground station, the conical shape reflects the air pushed down by the drone to provide a restoring force that pushes the drone towards a center of the ground station. In some implementations, the ground station and the drone may both have a conical form. In some implementations, the ground station and/or the drone may have a shape that provides similar self-restoring benefits as the conical form, such as a parabolic shape, hyperbolic shape, or other similar shape.

Figure 1:
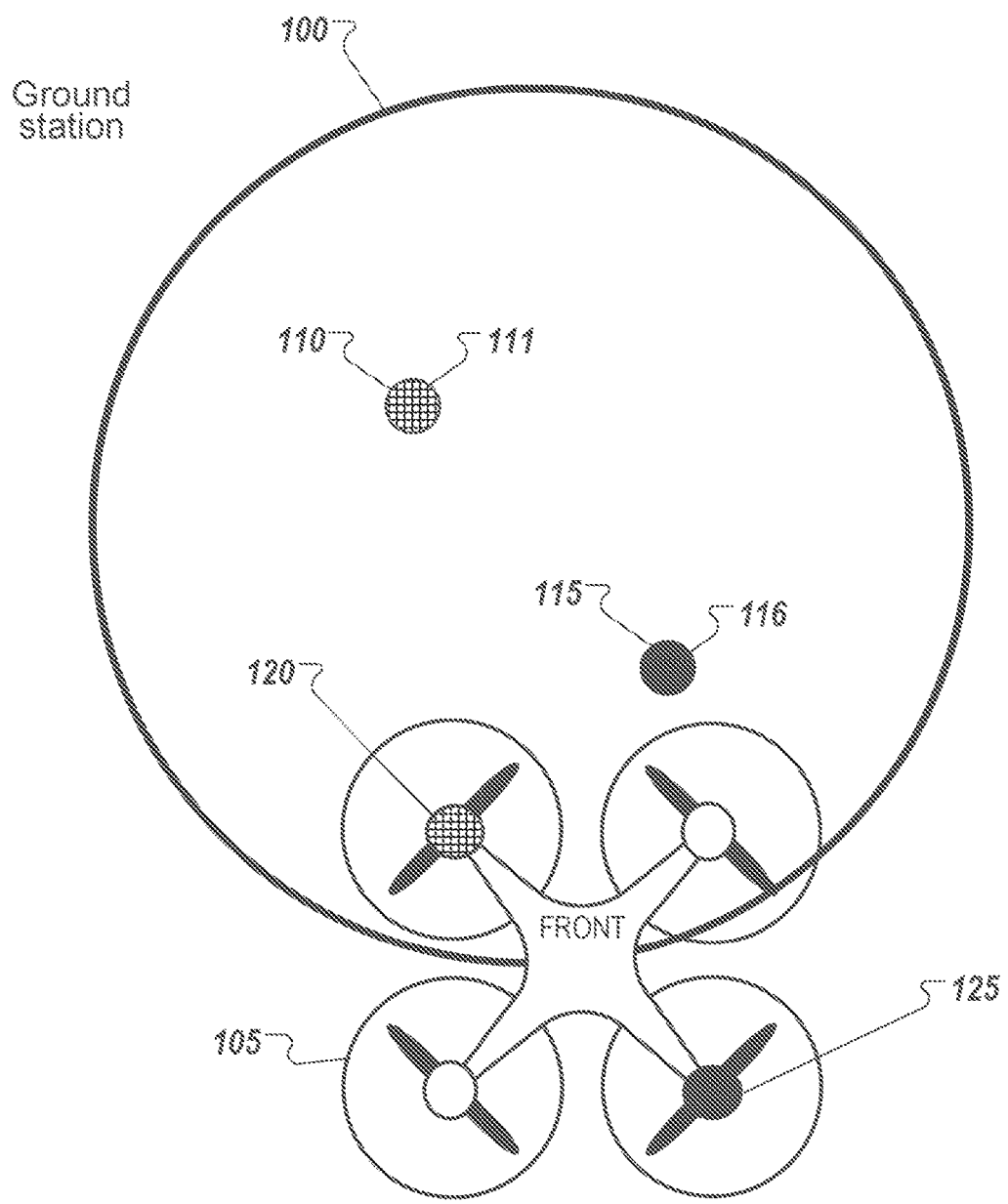
FIG. 1 illustrates an example drone approaching an example ground station.
Figure 2:
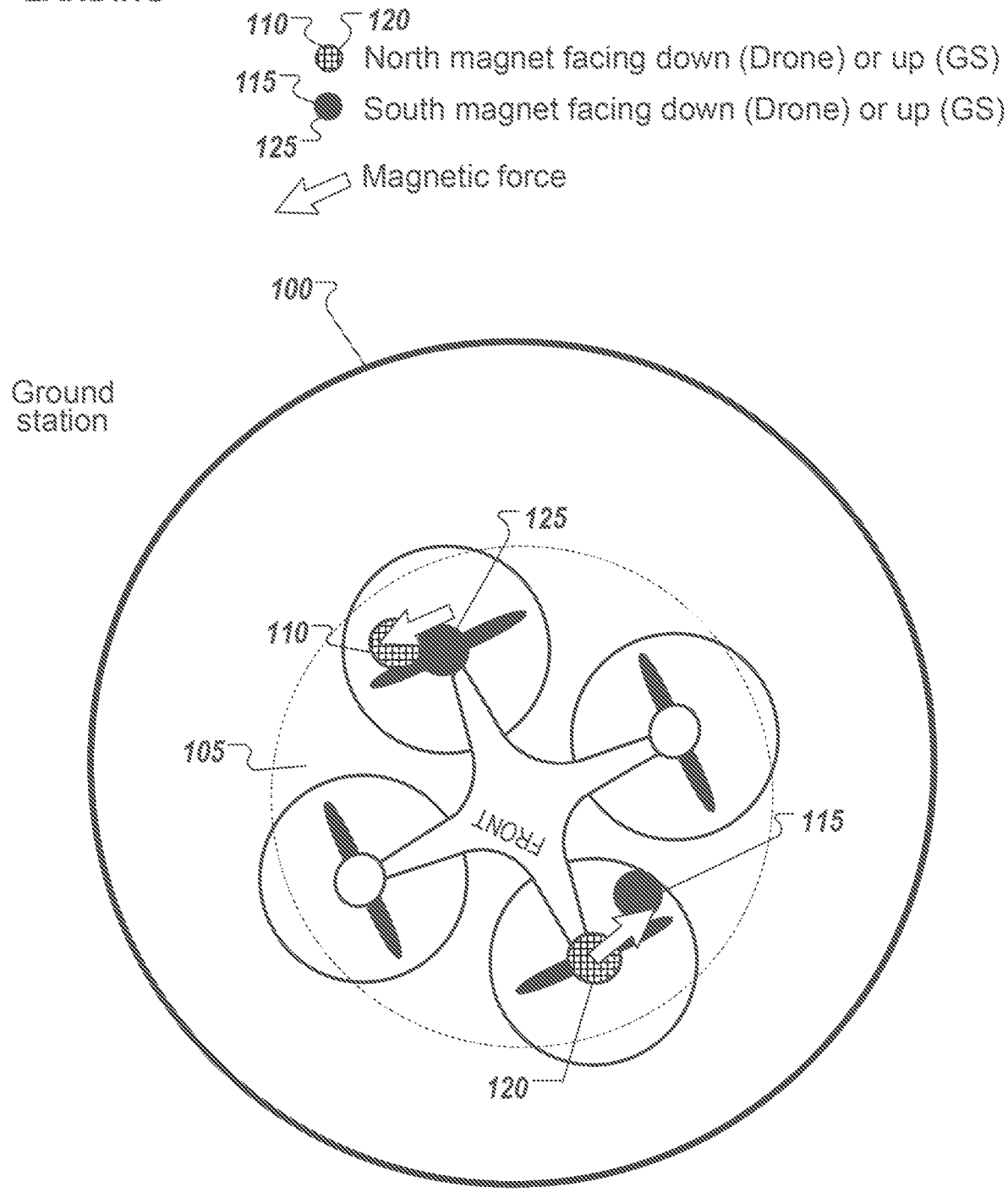
FIG. 2 illustrates an example drone landing on an example ground station.
Figure 3:
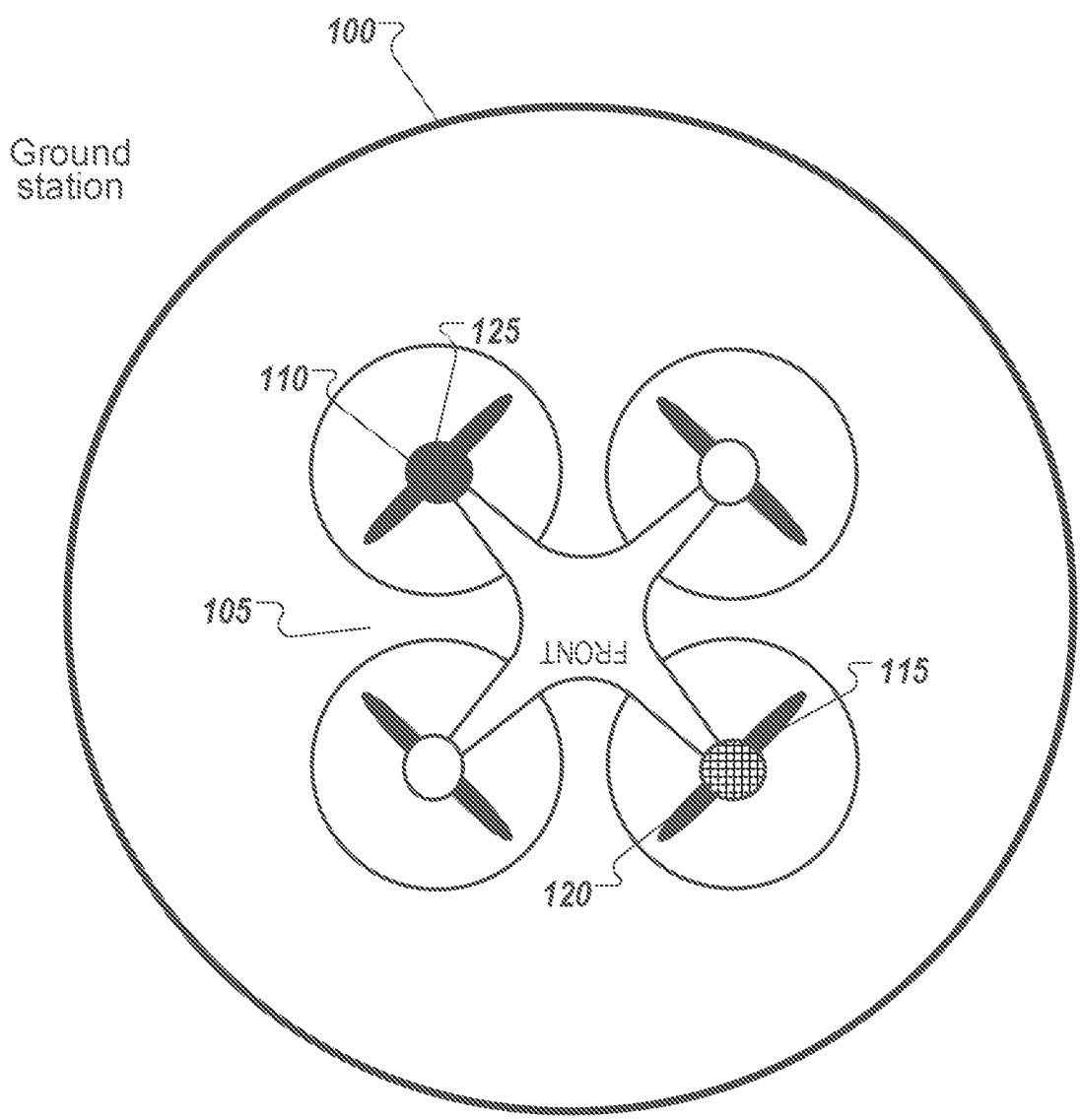
FIG. 3 illustrates an example drone latching to an example ground station.

FIG. 1 illustrates an example drone 105 approaching an example ground station 100. FIG. 2 illustrates an example drone 105 landing on an example ground station 100. FIG. 3 illustrates an example drone 105 latching to an example ground station 100. The drone 105 and ground station 100 may include particular mechanical characteristics to improve takeoff and/or landing repeatability. The ground station 100 contains magnetic components 110 and 115 that allow for latching the drone 105 into place.

The drone 105 contains magnetic components 120 and 125 of similar physical position but of opposite polarity relative to the correct orientation in the ground station. As the drone 105 approaches the ground station 100 from the incorrect orientation, the magnets 110, 115, 120, and 125 do not align and therefore, provide no retention force to keep the drone 105 in the ground station 100. If and as necessary, after landing, the drone 105 may pivot in place to reach its proper orientation. As the drone 105 rotates, the magnet pair 110 and 125 and magnet pair 115 and 120 between the drone 105 and ground station 100 will begin to provide a capture force to hold the drone 105 in the correct position. By using magnets of differing polarity within the drone 105 and ground station 100, a false position cannot occur if using symmetric magnetic positions. The magnet pair 110 and 120 and magnet pair 115 and 125 between the ground station and drone will be of the same polarity in this orientation and repel.

By using magnets in the landing mechanism for latching and when the magnets in the drone 105 approach the ground station 100 magnets, the magnetic force begins to increase thus further rotating the drone 105 into the proper position on the ground station 100. This capability allows for precise alignment each time the drone is placed on the ground station as the magnetic force can be self-centering. This occurs regardless of performing an automated landing or by manual placement. For example, if the drone 105 is manually picked up for cleaning, the magnets 110, 115, 120, and 125 can restore the drone 105 position relative to the ground station 100 to the same location as long as the placement is sufficiently close to allow for the magnetic attraction to pull the drone 105 into the proper place. This precision placement achieved through this method helps ensure consistent and known orientation of the drone relative to the ground station 100. It also ensures alignment for charging and optimizes proper heading.

In some implementations, the magnetic components 110 and 115 may be electromagnets that may be dynamically controlled to generate magnet fields with different polarities. For example, the magnetic components 110 may generate a field where the north pole is closer to a top of the ground station than a south pole when a positive current is applied to the magnetic component 110. In another example, the magnetic component 110 may generate a field where the south pole is closer to a top of the ground station than a north pole when a negative current is applied to the magnetic component 110.

Dynamic controlling magnetic fields may enable the drone 105 to be landed with different final orientations. For example, when privacy is desired, a drone may be landed where it stops with its camera facing a wall closest to the drone. In another example, when privacy is not needed or monitoring is desired, a drone may be landed where it stops with its camera facing away from the wall closest to the drone and towards an interior of the room so it has the most view of what's happening within the room.

Additionally or alternatively, dynamically controlling magnetic fields may help the drone 105 land on the ground station 100. For example, the magnetic components 110 and 115 may be controlled to generate magnet fields when the drone 105 is close to a final orientation so that the drone is pulled to the final orientation. In the example, were the magnet components 110 and 115 to generate the magnet fields earlier before the drone 105 is close to the final orientation, they drone 105 may instead be pushed away from the ground station 100. Waiting to generate the magnet fields until the drone 105 is close to the final orientation may also reduce the power used by the ground station 100.

Additionally or alternatively, the drone 105 may include electromagnets that may dynamically generate magnetic fields with different polarities. Having the drone 105 generate magnetic fields may allow the ground station 100 to instead have fixed magnets. However, having the electromagnets in the ground station 100 may be more advantageous as having electromagnets on the drone 105 may increase power usage of the drone 105 and/or increase a weight of the drone 105.

In some implementations, the ground station 100 may include a centrally located electromagnet that rests directly under the drone when the drone is docked as a sole or additional way of capture where the drone has a complementary magnet under its centroid. If present, the other two landing electromagnets as shown in the filing can be turned off and the drone would be free to yaw in place about its vertical axis to simulate a panning operation of the camera or at the customer's request, face the wall (or the room depending on initial conditions) without having to leave the ground station. This may have the added benefit of potentially still keeping a consistent heading for take off when using non-electromagnets, such as small detents in the surface, to align.

The ground station 100 can be on a mobile platform that allows for the ground station 100 to be moved to the location of the drone 105 if a low battery condition occurs or the return path by air is blocked by an object such as a lamp.

Drone battery recharging can occur via the landing gear of the drone 105 to contacts 111, 116 on the ground station 100. These recharging contacts 111, 116 can be in the same or different physical location on the drone/ground station as the magnetic components 110 and 115. If collocated with the magnets, the magnetic components could be shaped similar to a washer with a single contact in the center, one for positive terminal on one magnet and one for negative terminal on the other.

Ground station 100 physical features can allow for any onboard drone cameras to see into the room and act as a fixed camera.

Figure 4:
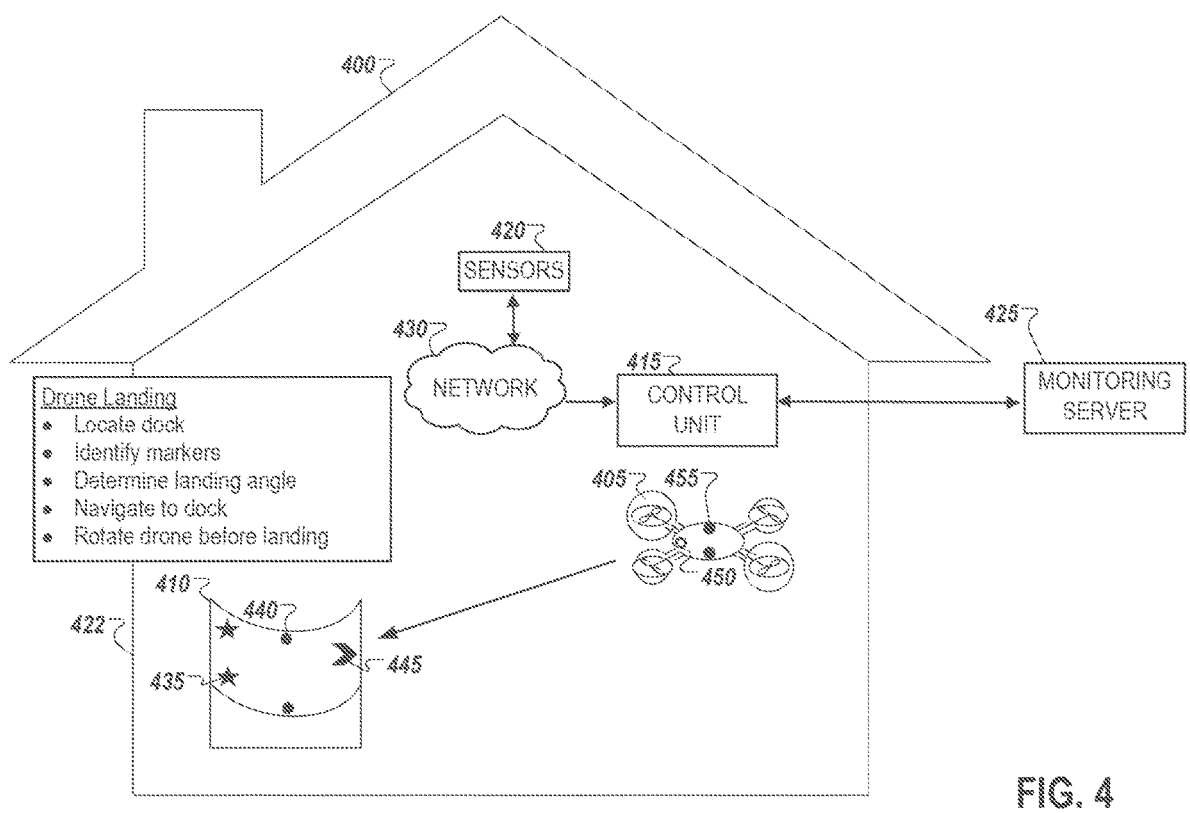
FIG. 4 illustrates an example drone landing at an example ground station.

FIG. 4 illustrates an example drone 405 landing at an example ground station 410. Briefly, and as described in more detail below, the drone 405 approaches the ground station 410 after navigating the property 400. The drone 405 may analyze sensor data from onboard sensors and/or sensor data collected by the sensors 420 of the monitoring system that monitors the property 400. Based on analyzing the sensor data, the drone 405 may locate the drone 405 and determine an appropriate approach angle. As the drone approaches the ground station 410, the conical shape of the ground station 410 and the magnets 440 provides corrective forces to ensure the drone 410 lands in the center of the ground station 410.

In more detail, the drone 405 is configured to navigate the property 400 and communicate with the control unit 415 over the network 430. The drone 405 may provide sensor data from onboard sensors to the control unit 415. The control unit 415 may also receive sensor data from sensors 420 located around the property 400. The control unit 415 may analyze the sensor data to determine the status of the property 400. The control unit 415 may communicate with the monitoring server 425 and report the status of the property 425. In some instances, the control unit 415 may transmit the sensor data to the monitoring server 425 for analysis. Any operation performed by the control unit 415, monitoring server 425, and drone 405 may be performed by any combination of the control unit 415, monitoring server 425, and drone 405.

The property 400 may include a ground station 410 where the drone 405 can dock and charge. The drone 405 may also continue to collect, analyze, and transmit sensor data while docked. The drone 405 may dock in response to a low battery or completion of a task. To dock, the drone 405 may use a camera or other sensor 450 to location the ground station 410. The ground station 410 may include various markers 435 that the drone 405 can identify when analyzing captured images. The ground station 410 may also include an orientation marker 445 that indicates what direction the drone 405 should be facing when docked.

When the drone 405 locates the ground station 410, the drone 405 may calculate an approach angle. The approach angle may be such that the drone 405 can avoid any objects in the vicinity of the ground station 410. For example, if the ground station 410 is under a table, then the drone 405 will calculate an approach angle that avoids the top of the table.

When the drone 405 is above the ground station 410, the magnets 455 of the drone 410 and the magnets 440 of the ground station 410 may induce a force that orients the drone 405 in the proper direction and/or above the center of the ground station 410. The ground station 410 may have a conical shape that allows the ground station 410 to reflect air pushed down by the drone 405 back to the drone 405 to help orient the drone 405 over the center of the ground station 410. Both of these forces help to guide the drone 405 to the center of the ground station and in an orientation that allows the drone 405 to collect image data of the property using the camera 450 while docked. If not oriented correctly, then the drone 405 may have difficulty launching from the ground station 410 and may collect image data of a wall.

Figure 5:
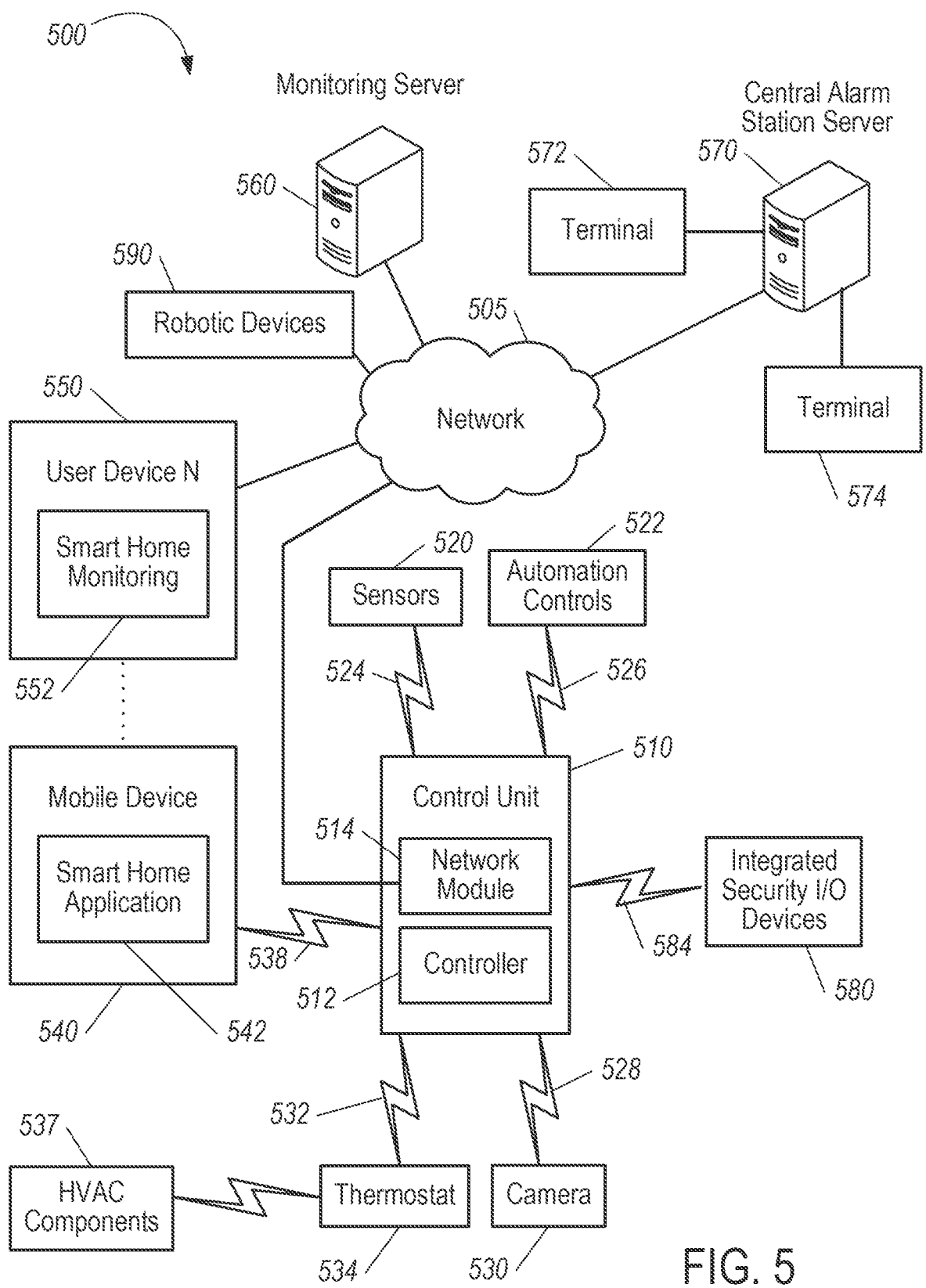
FIG. 5 is a diagram illustrating an example of a property monitoring system.

FIG. 5 is a diagram illustrating an example of a home monitoring system 500. The monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. In addition, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 590 may be devices that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid-state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

In addition, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events generated by the control unit 510. In this example, the monitoring server 560 may exchange electronic communications with the network module 514 included in the control unit 510 to receive information regarding events detected by the control unit 510. The monitoring server 560 also may receive information regarding events from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The monitoring server 560 can be configured to provide information (e.g., activity patterns) related to one or more residents of the home monitored by the system 500 (e.g., user 108). For example, one or more of the sensors 520, the home automation controls 522, the camera 530, the thermostat 534, and the integrated security devices 580 can collect data related to a resident including location information (e.g., if the resident is home or is not home) and provide location information to the thermostat 534.

The central alarm station server 570 is an electronic device configured to provide alarm monitoring service by exchanging communications with the control unit 510, the one or more user devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the home monitoring application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a home monitoring application 552. The home monitoring application 542 refers to a software/firmware program running on the corresponding mobile device that enables the user interface and features described throughout. The user device 540 may load or install the home monitoring application 542 based on data received over a network or data received from local media. The home monitoring application 542 runs on mobile devices platforms, such as iPhone, iPod touch, Blackberry, Google Android, Windows Mobile, etc. The home monitoring application 542 enables the user device 540 to receive and process image and sensor data from the monitoring system.

The user device 540 may be a general-purpose computer (e.g., a desktop personal computer, a workstation, or a laptop computer) that is configured to communicate with the monitoring server 560 and/or the control unit 510 over the network 505. The user device 540 may be configured to display a smart home user interface 552 that is generated by the user device 540 or generated by the monitoring server 560. For example, the user device 540 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, and the robotic devices 590. The one or more user devices 540 and 550 receive data directly from the sensors 520, the home automation controls 522, the camera 530, and the robotic devices 590, and sends data directly to the sensors 520, the home automation controls 522, the camera 530, and the robotic devices 590. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, and the robotic devices 590, and are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, and the robotic devices 590 to a pathway over network 505 when the one or more user devices 540 and 550 are farther from the sensors 520, the home automation controls 522, the camera 530, the thermostat 534, and the robotic devices 590.

In some examples, the system leverages GPS information from the one or more user devices 540 and 550 to determine whether the one or more user devices 540 and 550 are close enough to the sensors 520, the home automation controls 522, the camera 530, the thermostat 534, and the robotic devices 590 to use the direct local pathway or whether the one or more user devices 540 and 550 are far enough from the sensors 520, the home automation controls 522, the camera 530, the thermostat 534, and the robotic devices 590 that the pathway over network 505 is required.

In other examples, the system leverages status communications (e.g., pinging) between the one or more user devices 540 and 550 and the sensors 520, the home automation controls 522, the camera 530, the thermostat 534, and the robotic devices 590 to determine whether communication using the direct local pathway is possible. If communication using the direct local pathway is possible, the one or more user devices 540 and 550 communicate with the sensors 520, the home automation controls 522, the camera 530, the thermostat 534, and the robotic devices 590 using the direct local pathway. If communication using the direct local pathway is not possible, the one or more user devices 540 and 550 communicate with the sensors 520, the home automation controls 522, the camera 530, the thermostat 534, and the robotic devices 590 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

Figure 6:
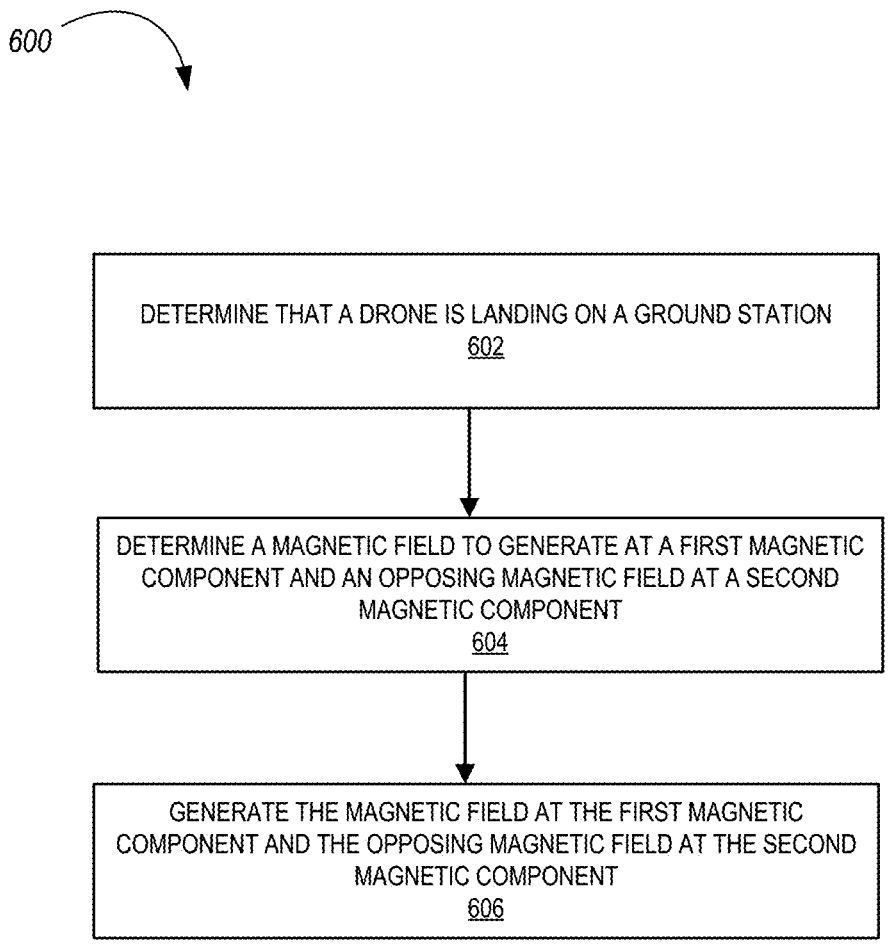
FIG. 6 is a flowchart of an example process for a drone landing on an example ground station.

FIG. 6 is a flowchart of an example process 600 for a drone landing on an example ground station. Briefly, and as will be described in more detail below, the process 600 includes determining that a drone is landing on a ground station (602), determining a magnetic field to generate at a first magnetic component and an opposing magnetic polar at a second magnetic component (604), and generating the magnetic field at the first magnetic component and the opposing magnetic field at the second magnetic component (606).

The process 600 includes determining that a drone is landing on a ground station. For example, the ground station 410 or the control unit 415 may determine that the drone 405 is landing. In some implementations, determining that a drone is landing on a ground station includes receiving an indication from the drone that the drone is landing. For example, the ground station 410 or the control unit 415 may receive an indication from the drone 405 that the drone 405 is landing.

The process 600 includes based on determining that the drone is landing on the ground station, determining a magnetic field to generate at a first magnetic component at a first position in the ground station and an opposing magnetic polar at a second magnetic component at a second position in the ground station. For example, the ground station 410 or the control unit 415 may determine to generate a field where the north pole is closer to a top of the ground station than a south pole at the magnetic component 110 and generate a field where the south pole is closer to a top of the ground station than a north pole at the magnetic component 115.

In some implementations, based on determining that the drone is landing on the ground station, determining a magnetic field to generate at a first magnetic component at a first position in the ground station and an opposing magnetic polar at a second magnetic component at a second position in the ground station includes determining a final orientation for the drone to land and determining the magnetic field based on the final orientation determined for the drone. For example, the ground station 410 or the control unit 415 may determine to face the drone 405 at a nearest wall.

In some implementations, determining a final orientation for the drone to land includes determining that a property is occupied and based on determining that the property is occupied, landing the drone facing a wall. For example, the ground station 410 may receive an indication from the control unit 415 that at least one person is currently in a property and, in response, determine a final orientation of the drone 405 facing the wall closest to the drone 405. In another example, the control unit 415 may determine from motion detected in the home by a PIR motion sensor and/or detection of a human in video that at least one person is currently in a property and, in response, determine a final orientation of the drone 405 facing the wall.

In some implementations, determining a final orientation for the drone to land includes determining that a property is unoccupied and based on determining that the property is unoccupied, landing the drone facing away from a wall 422. For example, the ground station 410 may receive an indication from the control unit 415 that no one is currently in a property and, in response, determine a final orientation of the drone 405 facing away from the wall 422 closest to the drone 405. In another example, the control unit 415 may determine from a lack of motion detected in the home by a PIR motion sensor and/or a lack of detection of a human in video and, in response, determine a final orientation of the drone 405 facing away from the wall 422.

In some implementations, determining a final orientation for the drone to land may be based on other factors. For example, the control unit 415 may determine that the alarm system is set to "armed—stay" or that an alarm condition is active and, in response, determine to land the drone 405 facing away from the wall. In another example, the control unit 415 may land the drone 405 facing away from the wall when checking on something, and then, once resolved, pivot the drone 405 back to face the wall, or conversely, pivot the drone 405 away from the wall at an initial alarm condition, prior to being tasked with an actual flight mission.

In some implementations, the process 600 includes based on the final orientation, determining a positive current to provide through a first recharging contact of the ground station and a negative current to provide through a second recharging contact of the ground station. For example, the drone 405 may require a positive current at a first contact on a first leg on the drone and a negative current at a second contact on a second leg on the drone, and when the first leg lands on the first recharging contact in a first orientation, a positive current may be provided to the first recharging contact. In another example, when the first leg lands on the second recharging contact in a second orientation, a positive current may instead be provided to the second recharging contact.

The process 600 includes generating the magnetic field at the first magnetic component and the opposing magnetic field at the second magnetic component. For example, the ground station 410 generate a field where the north pole is closer to a top of the ground station than a south pole at the magnetic component 110 and generate a field where the south pole is closer to a top of the ground station than a north pole at the magnetic component 115.

In some implementations, generating the magnetic field at the first magnetic component and the opposing magnetic field at the second magnetic component includes determining that a current orientation of the drone satisfies an orientation criteria and based on determining that the current orientation of the drone satisfies the orientation criteria, generating the magnetic field at the first magnetic component. For example, the ground station 410 may avoid creating a magnetic field too early that makes it more difficult for the drone 405 to land by waiting for an orientation criteria to be satisfied before generating the magnetic fields.

In some implementations, determining that a current orientation of the drone satisfies an orientation criteria includes determining that the current orientation results in the magnetic field at the first magnetic component attracting a particular magnet in the drone. For example, the ground station 410 may determine that the drone 405 has indicated that the current orientation of the drone 405 is close enough to the final orientation that generating the magnetic fields will attract a magnet in the drone to its final position.

In some implementations, determining that a current orientation of the drone satisfies an orientation criteria includes determining that the current orientation results in the magnetic field at the first magnetic component repelling a particular magnet in the drone. For example, the ground station 410 may determine that the drone 405 has indicated that the current orientation of the drone 405 is close enough to the final orientation that generating the magnetic fields will attract a magnet in a first leg of the drone to its final position.

In some implementations, generating the magnetic field at the first magnetic component and the opposing magnetic field at the second magnetic component includes applying a positive current to the first magnetic component. For example, the ground station 410 may apply two hundred milliamp positive charge to the magnetic component 110.

In some implementations, the process 600 includes determining that the drone is taking off and based on determining that the drone is taking off, stopping generation of the magnetic field at the first magnetic component. For example, the ground station 410 may continue generating the magnetic fields after the drone lands 405 so that the drone is less easily accidentally displaced and, in response to the drone 405 or control unit 415 indicating that the drone 405 is going to take off, the ground station 410 may stop generating the magnetic fields.

In some implementations, the process 600 includes based on determining that the drone is taking off, generating the opposing magnetic field at the first magnetic component. For example, the ground station 410 may help provide additional magnetic repelling force for the drone 405 to take off so, in response to the drone 405 or control unit 415 indicating that the drone 405 is going to take off, the ground station 410 may generate magnetic fields that repel the drone 405.

In some implementations, the process 600 includes stopping generation of the magnetic field at the first magnetic component and the opposing magnetic field at the second magnetic component and generating the magnetic field at a third magnetic component and the opposing magnetic field at a fourth magnetic component. For example, the ground station 410 may rotate the drone 405 by sequentially generating magnetic forces at magnetic components in a circular pattern.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   determining that a drone is landing on a ground station and has not yet landed on the ground station;
   in response to determining that the drone is landing on the ground station and has not yet landed on the ground station, determining, for a first magnetic component and a second magnetic component included in the ground station, to generate a first magnetic field at the first magnetic component at a first position in the ground station and to generate a second magnetic field with an opposing polarity at the second magnetic component at a second position in the ground station; and
   generating, while the drone has not yet landed on the ground station and using the first magnetic component and the second magnetic component included in the ground station, the first magnetic field at the first magnetic component and the second magnetic field at the second magnetic component to enable:
   a first corresponding magnetic component in the drone to couple la magnetic attraction with the first magnetic component using the first magnetic field, and a second corresponding magnetic component in the drone to couple by magnetic attraction with the second magnetic component using the second magnetic field.

2. The method of claim 1, comprising:
   determining a final orientation for the drone to land; and
   determining a polarity for the first magnetic field and the opposing polarity for the second magnetic field using the final orientation determined for the drone.

3. The method of claim 2, wherein determining the final orientation for the drone to land comprises:
   determining that a property in which the ground station is located is occupied by at least one human; and
   in response to determining that the property in which the ground station is located is occupied by at least one human, determining the final orientation for the drone with a field of view of a camera included in the drone facing a wall i) at the property and ii) that is closest to the drone.

4. The method of claim 2, wherein determining the final orientation for the drone to land comprises:
   determining that a property in which the ground station is located is unoccupied by any humans; and
   in response to determining that the property in which the ground station is located is unoccupied by any humans, determining the final orientation for the drone with a field of view of a camera included in the drone facing away from a wall i) at the property and ii) that is closest to the drone.

5. The method of claim 2, comprising:
   using the final orientation for the drone to land and the polarity for the magnetic field and the opposing polarity for the opposing magnetic field, determining to provide a) a positive current through a first recharging contact of the ground station and b) a negative current through a second recharging contact of the ground station.

6. The method of claim 1, comprising:
   determining that a current orientation of the drone satisfies an orientation criteria wherein generating the first magnetic field at the first magnetic component and the second magnetic field at the second magnetic component is responsive to determining that the current orientation of the drone satisfies the orientation criteria.

7. The method of claim 6, wherein:
   determining that the current orientation of the drone satisfies an orientation criteria comprises:
   determining that a difference between the current orientation of the drone and a final orientation of the drone satisfies a threshold difference; and
   in response to determining that the difference between the current orientation of the drone and the final orientation of the drone satisfies the threshold difference, determining that the current orientation of the drone will likely cause the magnetic field at the first magnetic component to attract a particular magnet in the drone when the magnetic field is generated.

8. The method of claim 6, wherein:
   determining that the drone is landing on a ground station comprises receiving an indication from the drone that the drone is landing, and
   determining that a current orientation of the drone satisfies the orientation criteria comprises receiving an indication from the drone of the current orientation of the drone.

9. The method of claim 1, comprising rotating the drone while the drone has not yet landed on the ground station by:
   determining, for a third magnetic component and a fourth magnetic component included in the ground station, to generate:
   a third magnetic field at the third magnetic component at a third position in the ground station, the third position being offset from the first position, and
   a fourth magnetic field at the fourth magnetic component at a fourth position in the ground station, the fourth position being offset from the second position;
   stopping generation of the first magnetic field at the first magnetic component and the second magnetic field at the second magnetic component; and
   generating, while the drone has not yet landed on the ground station and using the third magnetic component and the fourth magnetic component included in the ground station:
   the third magnetic field at a third the third magnetic component to enable the first corresponding magnetic component in the drone to couple by magnetic attraction with the third magnetic component, and
   the fourth magnetic field at the fourth magnetic component to enable the second corresponding magnetic component in the drone to couple by magnetic attraction with the fourth magnetic component,
   wherein the third magnetic field has a same polarity as the first magnetic field and the fourth magnetic field has a same polarity as the second magnetic field.

10. The method of claim 9, wherein rotating the drone while the drone has not yet landed on the ground station is responsive to determining that a current orientation of the drone does not satisfy an orientation criteria.

11. The method of claim 1, comprising:
    determining a current orientation of drone;
    determining, using the current orientation of the drone, an alignment between the corresponding magnetic components in the drone and the magnetic components included in the ground station, including determining that the first magnetic component included in the ground station is nearer to the first corresponding magnetic component in the drone than to the second corresponding magnetic component in the drone; and determining, using the alignment, the polarity of the first magnetic field at the first magnetic component at the first position in the ground station, wherein the polarity of the first magnetic field attracts the polarity of the first corresponding magnetic component in the drone.

12. The method of claim 1, comprising:
determining that a current orientation of the drone does not satisfy an orientation criteria; and
determining a direction of rotation for the drone to satisfy the orientation criteria,
wherein determining to generate the first magnetic field and to generate the second magnetic field is responsive to determining that the current orientation of the drone does not satisfy the orientation criteria, the polarities of the first magnetic field and the second magnetic field being selected using the current orientation of the drone and the determined direction of rotation for the drone.

13. A system comprising:
one or more computers and one or more storage devices storing instructions that are operable, when executed by the one or more computers, to cause the one or more computers to perform operations comprising:
determining that a drone is landing on a ground station and has not yet landed on the ground station;
in response to determining that the drone is landing on the ground station and has not yet landed on the ground station, determining, for a first magnetic component and a second magnetic component included in the ground station, to generate a first magnetic field at the first magnetic component at a first position in the ground station and to generate a second magnetic field with an opposing polarity at the second magnetic component at a second position in the ground station; and
generating, while the drone has not yet landed on the ground station and using the first magnetic component and the second magnetic component included in the ground station, the first magnetic field at the first magnetic component and the second magnetic field at the second magnetic component to enable:
a first corresponding magnetic component in the drone to couple by magnetic attraction with the first magnetic component using the first magnetic field, and
a second corresponding magnetic component in the drone to couple by magnetic attraction with the second magnetic component using the second magnetic field.

14. The system of claim 13, comprising:
determining a final orientation for the drone to land; and
determining a polarity for the first magnetic field and the opposing polarity for the second magnetic field using the final orientation determined for the drone.

15. The system of claim 14, wherein determining the final orientation for the drone to land comprises:
determining that a property in which the ground station is located is occupied by at least one human; and
in response to determining that the property in which the ground station is located is occupied by at least one human, determining the final orientation for the drone with a field of view of a camera included in the drone facing a wall i) at the property and ii) that is closest to the drone.

16. The system of claim 14, wherein determining the final orientation for the drone to land comprises:
determining that a property in which the ground station is located is unoccupied by any humans; and
in response to determining that the property in which the ground station is located is unoccupied by any humans, determining the final orientation for the drone with a field of view of a camera included in the drone facing away from a wall i) at the property and ii) that is closest to the drone.

17. The system claim 14, the operations comprising:
using the final orientation for the drone to land and the polarity for the magnetic field and the opposing polarity for the opposing magnetic field, determining to provide a) a positive current through a first recharging contact of the ground station and b) a negative current through a second recharging contact of the ground station.

18. The system of claim 13, the operations comprising:
determining that a current orientation of the drone satisfies an orientation criteria wherein generating the first magnetic field at the first magnetic component and the second magnetic field at the second magnetic component is responsive to determining that the current orientation of the drone satisfies the orientation criteria.

19. The system of claim 18, wherein:
determining that the current orientation of the drone satisfies an orientation criteria comprises:
determining that a difference between the current orientation of the drone and a final orientation of the drone satisfies a threshold difference; and
in response to determining that the difference between the current orientation of the drone and the final orientation of the drone satisfies the threshold difference, determining that the current orientation of the drone will likely cause the magnetic field at the first magnetic component to attract a particular magnet in the drone when the magnetic field is generated.

20. A non-transitory computer-readable medium storing software comprising instructions executable by one or more computers which, upon such execution, cause the one or more computers to perform operations comprising:
determining that a drone is landing on a ground station and has not yet landed on the ground station;
in response to determining that the drone is landing on the ground station and has not vet landed on the ground station, determining, for a first magnetic component and a second magnetic component included in the ground station, to generate a first magnetic field at the first magnetic component at a first position in the ground station and to generate a second magnetic field with an opposing polarity at the second magnetic component at a second position in the ground station; and
generating, while the drone has not yet landed on the ground station and using the first magnetic component and the second magnetic component included in the ground station, the first magnetic field at the first magnetic component and the second magnetic field at the second magnetic component to enable: a first corresponding magnetic component in the drone to couple by magnetic attraction with the first magnetic component using the first magnetic field, and a second corresponding magnetic component in the drone to couple by magnetic attraction with the second magnetic component using the second magnetic field.

* * * * *

UNITED STATES PATENT AND TRADEMARK OFFICE
CERTIFICATE OF CORRECTION

PATENT NO. : 11,897,630 B2
APPLICATION NO. : 17/079085
DATED : February 13, 2024
INVENTOR(S) : Babak Rezvani et al.

Page 1 of 1

It is certified that error appears in the above-identified patent and that said Letters Patent is hereby corrected as shown below:

In the Claims

In Claim 1, Column 19, Line 26, delete "la" and insert -- by --.

In Claim 6, Column 19, Line 65, after "criteria" insert -- , --.

In Claim 9, Column 20, Line 43, after "at" delete "a third".

In Claim 18, Column 22, Line 18 (approx.), after "criteria" insert -- , --.

In Claim 20, Column 22, Line 43 (approx.), delete "vet" and insert -- yet --.

Signed and Sealed this
Twenty-sixth Day of March, 2024

Katherine Kelly Vidal
*Director of the United States Patent and Trademark Office*